J. KASARDA.
GRATER FOR CULINARY USE.
APPLICATION FILED MAY 31, 1910.

986,575.

Patented Mar. 14, 1911.

Witnesses
William C. Linton.
H. J. Austin.

Inventor
John Kasarda.
By Joshua R. H. Potts,
Attorney

UNITED STATES PATENT OFFICE.

JOHN KASARDA, OF ST. CLAIR, PENNSYLVANIA.

GRATER FOR CULINARY USE.

986,575.   Specification of Letters Patent.   Patented Mar. 14, 1911.

Application filed May 31, 1910.  Serial No. 564,275.

*To all whom it may concern:*

Be it known that I, JOHN KASARDA, a subject of the Emperor of Austria-Hungary, residing at St. Clair, county of Schuylkill, and State of Pennsylvania, have invented certain new and useful Improvements in Graters for Culinary Use, of which the following is a specification.

My invention relates to culinary devices and particularly to graters for culinary use.

The object of my invention is to provide an improved grater for culinary use adapted to be secured in any suitable place such as to a table, shelf or chair and provided with a spout for directing the material into a receptacle.

A further object of my invention is to provide a grater of the class mentioned consisting of a hopper and a rotary scraper equipped with means for preventing the disintegrated material from returning to the hopper.

A further object of my invention is to provide improved means for attaching the device to a table, shelf or the like.

Other objects will appear hereinafter.

My invention will be more readily understood by reference to the accompanying drawings forming a part of this specification and in which—

Figure 1:
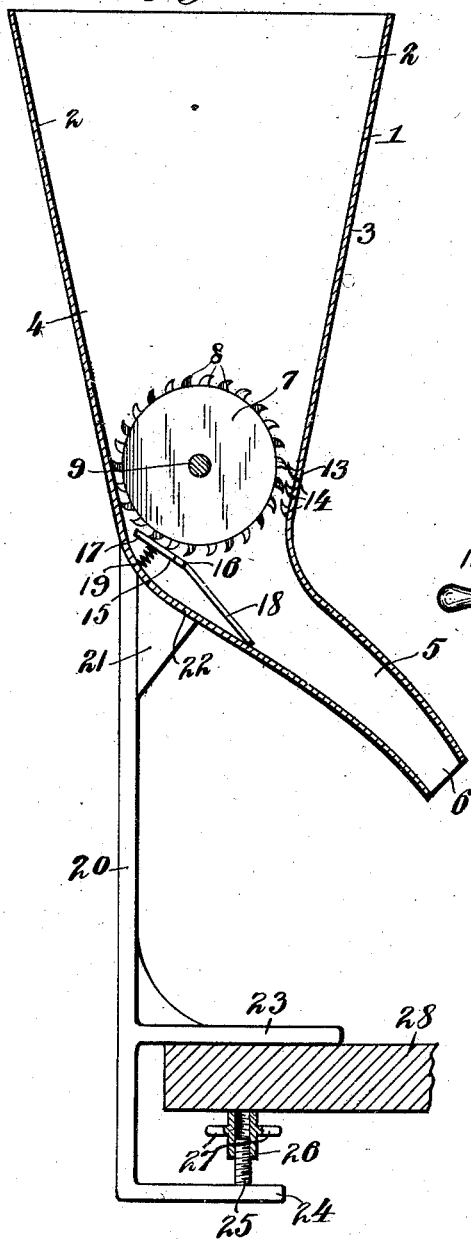
Figure 2:
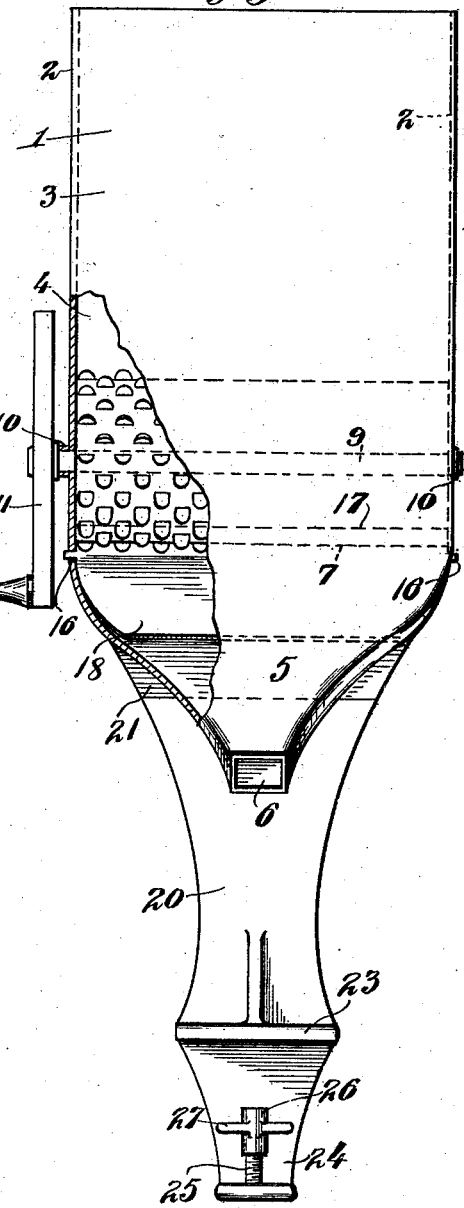

Figure 1 is a vertical section of a scraper or grater embodying my invention in its preferred form, and Fig. 2 is a front elevation of the same partially broken away to illustrate the rotary scraper.

Referring now to the drawings 1 indicates the hopper of the device which comprises parallel tapered side walls 2—2 and downwardly converging front and rear walls 3 and 4 respectively. The hopper is preferably formed of sheet metal and terminates at its lower end in a forwardly and downwardly curved closed spout 5 which tapers from the bottom of the hopper to the discharge end or mouth 6.

Rotatably mounted in the bottom of the hopper 1 is a cylindrical rotary scraper which comprises a body 7 and a plurality of teeth 8. The body 7 fits snugly between the side walls 2 and is mounted upon a shaft 9 having bearings 10 formed in said walls. One end of the shaft 9 projects beyond the hopper a short distance and is provided with a crank wheel 11 having a handle 12 for turning the same. The teeth 8 of the scraper are arranged in longitudinal rows on the cylindrical body 7 and the teeth of the alternate rows are staggered with relation to each other so that the teeth of each row will engage the portion of the material to be ground which was not engaged by the teeth of preceding row. The teeth are curved slightly forwardly and are well rounded as shown clearly in Fig. 2.

As before stated the rotary scraper fits snugly between the walls 2 of the hopper, and it is arranged so that the teeth 8 barely escape contact with the rear wall 4 leaving a small space 13 between the teeth and the front wall 3. Formed on the wall 3 directly opposite the scraper and projecting into the space 13 are a plurality of teeth 14 which are preferably upwardly inclined and arranged in parallel rows across the wall 3.

Pivotally mounted beneath the scraper is a plate 15 having lugs or trunnions 16 which project through the side walls 2 as shown in Fig. 2. The plate 15 comprises a flat portion 17 adapted to lie tangent to the path of the teeth 8 and rest against their ends and a downwardly inclined portion 18 which projects a distance into the spout 5. The edges of the portion 17 lie parallel to and close against the walls 2 and the sides of the portion 18 are curved or tapered to conform to the shape of the side walls of the spout. A spring 19 is interposed between the portion 17 and the adjacent wall of the device which holds the portion 17 into yielding engagement with the teeth 8 thereby preventing the material which has been scraped off from again passing into the hopper and directing it into the spout.

The device is mounted upon a bracket comprising a vertical standard 20 provided at its upper end with an enlarged portion 21 affording a surface 22 of large area for securing the hopper thereto as by soldering, and means at the lower end for clamping the device to a table, shelf or the like. The clamp comprises a pair of horizontally disposed parallel arms 23 and 24 arranged one above the other and projecting from the standard 20 adjacent its lower end. The lower arm 24 is provided with an upwardly projecting threaded lug or stud 25 upon which is threaded a cylindrical sleeve 26 which is formed with a plurality of projections 27 affording means for turning the sleeve. It is obvious, by referring to Fig. 1, that the device may be readily clamped to a shelf or table 28 by turning the sleeve 26, and as readily detached therefrom.

Having described my invention what I claim as new and desire to secure by Letters Patent is:

In a culinary grater, a hopper, a rotary scraper arranged in the lower end thereof, an inclined tapered spout extending from the lower end of said hopper, a plate pivotally mounted beneath said scraper and extending into said spout, said plate comprising a portion substantially tangent to the scraper and a downwardly bent portion having its end normally resting on the bottom of the spout and the edges of said plate conforming to the shape of the adjacent walls of the hopper and spout respectively and a spring beneath the upper end of said plate for holding the same into yielding engagement with the scraper, substantially as described.

In testimony whereof I have signed my name to this specification in the presence of two subscribing witnesses.

JOHN KASARDA.

Witnesses:
JOHSEF FARIO,
MICHAEL POZIKA.

Copies of this patent may be obtained for five cents each, by addressing the "Commissioner of Patents. Washington, D. C."